US012633575B2

(12) United States Patent
Okamoto et al.

(10) Patent No.: US 12,633,575 B2
(45) Date of Patent: May 19, 2026

(54) POWER STORAGE DEVICE

(71) Applicant: KABUSHIKI KAISHA TOYOTA JIDOSHOKKI, Kariya (JP)

(72) Inventors: Yuki Okamoto, Kariya (JP); Yoshikatsu Kawabata, Kariya (JP); Masaki Inoue, Kariya (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 458 days.

(21) Appl. No.: 18/267,377

(22) PCT Filed: Oct. 14, 2021

(86) PCT No.: PCT/JP2021/038044
§ 371 (c)(1),
(2) Date: Jun. 14, 2023

(87) PCT Pub. No.: WO2022/130763
PCT Pub. Date: Jun. 23, 2022

(65) Prior Publication Data
US 2024/0055665 A1 Feb. 15, 2024

(30) Foreign Application Priority Data
Dec. 15, 2020 (JP) ................................. 2020-207815

(51) Int. Cl.
*H01M 10/0585* (2010.01)
*H01G 11/68* (2013.01)
(Continued)

(52) U.S. Cl.
CPC ........ *H01M 10/0585* (2013.01); *H01G 11/68* (2013.01); *H01M 4/583* (2013.01); *H01M 4/661* (2013.01); *H01M 10/0525* (2013.01)

(58) Field of Classification Search
None
See application file for complete search history.

(56) References Cited

U.S. PATENT DOCUMENTS

2016/0049625 A1 2/2016 Minamitani et al.
2018/0323410 A1 11/2018 Minamitani et al.
2019/0109304 A1* 4/2019 Yang ................. H01M 10/0585

FOREIGN PATENT DOCUMENTS

CN 105374959 A 3/2016
JP 2018-073583 A 5/2018
JP 2019-175778 A 10/2019

OTHER PUBLICATIONS

International Search Report of corresponding PCT Application No. PCT/JP2021/038044 dated Jan. 11, 2022.
(Continued)

*Primary Examiner* — Wyatt P Mcconnell
(74) *Attorney, Agent, or Firm* — Sughrue Mion, PLLC

(57) ABSTRACT

A power storage device includes a first electrode including a first active material layer formed on a first surface, a second electrode including a second active material layer formed on a first surface, a separator, and a spacer. The first active material layer has a longitudinal side of a first length. The second area has a second length between the spacer and the first active material layer. A ratio of the second length to the first length is 0.02 or less. At least one of corners of the first active material layer has a shape chamfered in an arc shape. A radius of curvature at a portion of the corner having a maximum curvature is 5 mm or more.

5 Claims, 3 Drawing Sheets

(51) Int. Cl.
 *H01M 4/583*      (2010.01)
 *H01M 4/66*      (2006.01)
 *H01M 10/0525*      (2010.01)

(56)          References Cited

OTHER PUBLICATIONS

Chinese Office Action dated Mar. 11, 2026, issued in Chinese application No. 202180084052.X.

* cited by examiner

FIG. 1

POWER STORAGE DEVICE

CROSS-REFERENCE TO RELATED APPLICATIONS

This application is a National Stage of International Application No. PCT/JP2021/038044 filed Oct. 14, 2021, claiming priority based on Japanese Patent Application No. 2020-207815 filed Dec. 15, 2020, the contents of all of which are incorporated herein by reference in their entirety.

TECHNICAL FIELD

The present disclosure relates to a power storage device.

BACKGROUND ART

Patent Document 1 discloses a flat power storage device formed by stacking a plurality of power storage cells, which are made individually, in series. The power storage cells as described above each include a positive electrode, a negative electrode, and a separator. The positive electrode is formed of a resin current collector and a positive electrode active material layer formed in a middle portion of one surface of the resin current collector. The negative electrode is formed of a resin current collector and a negative electrode active material layer formed in a middle portion of one surface of the resin current collector. The negative electrode active material layer is disposed so as to face the positive electrode active material layer of the positive electrode. The separator is interposed between the positive electrode and the negative electrode.

In addition, the above-described power storage cells each include a sealing portion that is disposed on outer peripheral portions of the resin current collectors and forms a liquid-tightly sealed space between the resin current collectors arranged side by side in a stacking direction of the power storage cells. The sealing portion maintains a distance between the resin current collectors arranged side by side to prevent short circuit between the resin current collectors, and forms the sealed space between the resin current collectors, the sealed space being filled with the electrolyte.

CITATION LIST

Patent Document

Patent Document 1: Japanese Patent Application Publication No. 2019-175778

SUMMARY OF DISCLOSURE

Technical Problem

One of methods of increasing a capacity of stacked-type power storage cells in which a plurality of positive electrodes and a plurality of negative electrodes are alternatively stacked with a separator interposed therebetween is increasing an area of each active material layer. In this case, the capacity of the power storage cells is increased with the shape of each power storage cell being kept flat.

However, when the configuration in which the active material layer has a large area is applied to each power storage cell which has the sealing portion that forms the sealed space between the positive electrode and the negative electrode, wrinkles and tears are easily formed in current collectors of the power storage cell. In detail, in each of the current collectors of the power storage cell, which has the sealed portion forming the sealed space, a periphery of a portion of the current collector adhering to the active material layer is fixed to the sealing portion. Here, in the current collector, only a non-adhesive portion of the current collector located between a portion to which the active material layer adheres and a portion to which the sealing portion adheres is allowed to deform. For that reason, when the portion of the current collector to which the active material layer adheres extends and contracts with expansion and contraction of the active material layer during charging and discharging of the power storage cell, the non-adhesive portion is partially and repeatedly deformed. Specifically, deformation in which the non-adhesive portion is bended or folded by the expansion of the active material layer and deformation in which the bended portion or folded portion of the non-adhesive portion is stretched by the contraction of the active material layer are alternatively repeated.

As the area of each active material layer is increased in order to increase the capacity of the power storage cells, an expansion amount of the active material layer during the charging and discharging of the power storage cell increases. A deformation amount of the non-adhesive portion also increases with the expansion and contraction of the active material layer. As a result, a load applied to the non-adhesive portion by the expansion and contraction of the active material layer increases, and wrinkles and tears are easily formed in the non-adhesive portion.

Solution to Problem

The power storage device that solves the above-described problem includes a first electrode including a first active material layer formed on a first surface of a first current collector, a second electrode including a second active material layer formed on a second surface of a second current collector, the second active material layer being disposed so as to face the first active material layer of the first electrode, a separator interposed between the first active material layer and the second active material layer, and a spacer disposed between the first surface of the first current collector and the first surface of the second current collector. The spacer is disposed so as to enclose the first active material layer and the second active material layer. The spacer adheres to the first surface of the first current collector and the first surface of the second current collector to form a sealed space between the first electrode and the second electrode. The first active material layer has a rectangular shape in a plan view as viewed in a stacking direction in which the first electrode and the second electrode are stacked. The first surface of the first current collector has an area to which the spacer does not adhere. The area includes a first area in which the first active material layer is formed and a second area in which the first active material layer is not formed. The first active material layer has a longitudinal side of a first length L1 in the plan view. The second area has a second length L2 between the spacer and the first active material layer in a direction parallel to the longitudinal side of the first active material layer. A ratio of the second length L2 to the first length L1 is 0.02 or less. At least one of corners of the first active material layer has a shape chamfered in an arc shape, and a radius of curvature at a portion of the corner having a maximum curvature is 5 mm or more.

The Inventors have found that when the area of the active material layer having the rectangular shape in the plan view is increased, wrinkles and tears formed in a non-adhesive portion are concentrated near a tip of each corner of the active material layer, the non-adhesive portion being an area to which the spacer does not adhere in the current collector and an area in which the active material layer is not formed. With the above-described configuration, the corners of the first active material layer, which has the rectangular shape in the plan view, of the first electrode each have the shape chamfered in the arc shape. In this case, during expansion of the first active material layer, concentration of a stress applied to the tip of each corner of the first active material layer is reduced, and the stress transmitted from the corner to the non-adhesive portion of the first current collector is distributed over a wide range. As a result, the maximum strain generated in the non-adhesive portion of the first current collector during expansion of the first active material layer decreases, so that wrinkles and tears that are formed in the non-adhesive portion are prevented.

The at least one of the corners of the first active material layer has an arc shape protruding outward.

With the above-described configuration, the at least one of the corners does not have a portion sharply protruding outward, so that the concentration of the stress by the expansion of the first active material layer on the portion of the corner is suppressed. For that reason, the effect of preventing the wrinkles and the tears from being formed in the non-adhesive portion of the first current collector is further remarkably seen. As compared to a corner which is C-chamfered, an amount of decreasing the area of the first active material layer, which is caused by chamfering the corner, can be kept small, thereby suppressing reduction in a capacity of the first electrode.

The radius of curvature is preferably 10 mm or more. With the above-described configuration, the maximum strain generated in the non-adhesive portion of the first current collector can be further reduced.

The radius of curvature is preferably 30 mm or less. The effect of decreasing the maximum strain generated in the above-described range of the first current collector by increasing the radius of curvature of the corner having the shape chamfered in the arc shape converges when the radius of curvature of the corner is over 30 mm. Thus, the above-described configuration suppresses the reduction in the capacity of the first electrode, which is caused by decreasing the area of the first active material layer because of forming the corner having the shape chamfered in the arc shape larger than necessary.

Preferably, the first current collector is made of a copper foil and the first active material layer contains a carbon-type active material.

In the configuration in which the first active material layer, which contains the carbon-based active material having the large expansion ratio during charging and discharging, and the copper foil are combined with each other, wrinkles and tears are particularly easily formed in the first current collector by the expansion and contraction of the first active material layer during the charging and discharging. For that reason, the above-described effect obtained by forming the corner of the first active material layer in a particular shape is further remarkably seen.

Advantageous Effect of Disclosure

According to the present disclosure, in the power storage device in which a member forms the sealed space between the current correctors arranged side by side, the wrinkles and the tears can be prevented from being formed in the current collectors when the area of each active material layer increases.

BRIEF DESCRIPTION OF DRAWINGS

FIG. 1 is a cross-sectional view of a power storage device.

DESCRIPTION OF EMBODIMENTS

Figure 2:
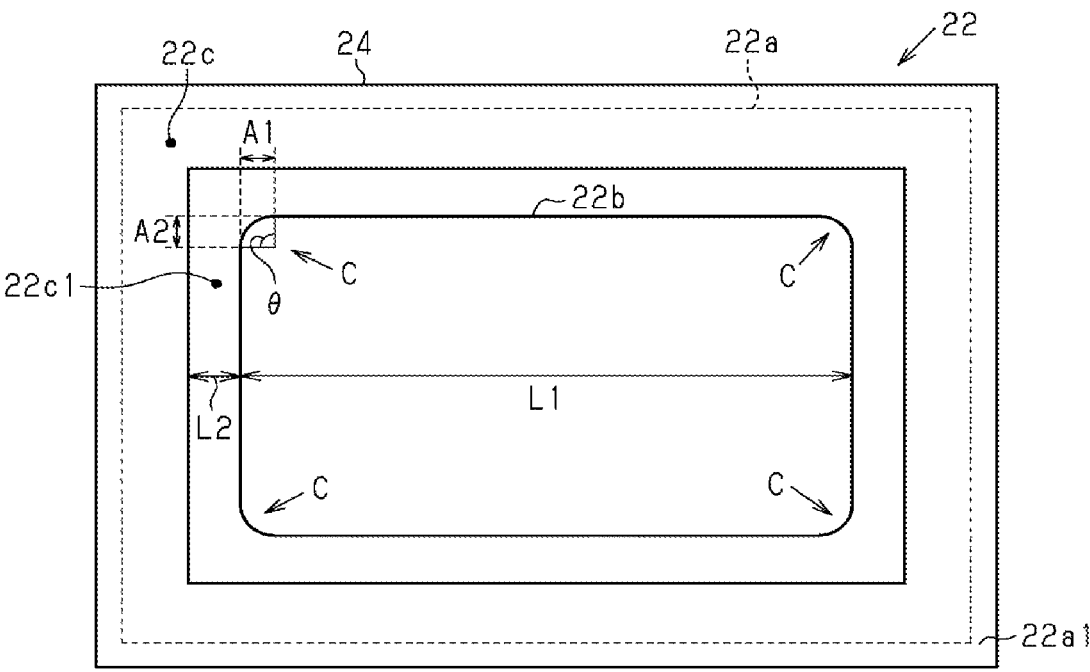
FIG. 2 is a plan view of a negative electrode.

The following will describe an embodiment according to the present disclosure invention with reference to the drawings.

Figure 1:
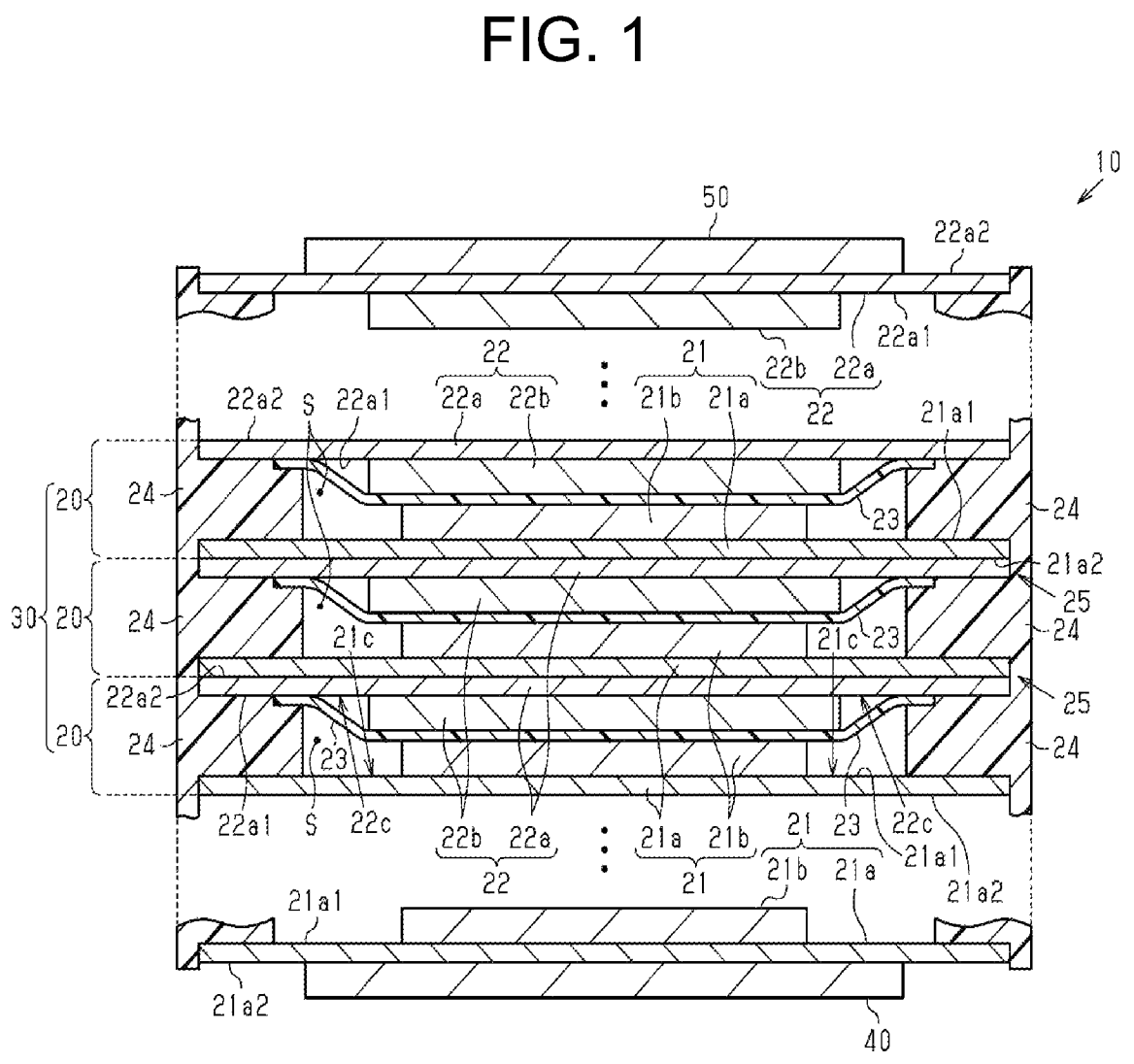

A power storage device 10 as illustrated in FIG. 1 is, for example, a power storage module used for a battery of various vehicles such as a forklift, a hybrid vehicle, and an electric vehicle. Examples of the power storage device 10 include a rechargeable battery such as a nickel-hydrogen secondary battery or a lithium-ion secondary battery. The power storage device 10 may be an electric double-layer capacitor. In the present embodiment, an example in which the power storage device 10 is the lithium-ion battery will be described.

Referring to FIG. 1, the power storage device 10 includes a cell stack 30 (stacked body) formed by stacking a plurality of power storage cells 20 in a stacking direction thereof. The stacking direction of the plurality of power storage cells 20 is hereinafter simply called the stacking direction. Each of the power storage cells 20 includes a positive electrode 21, a negative electrode 22, a separator 23, and a spacer 24.

The positive electrode 21 includes a positive current collector 21a and a positive electrode active material layer 21b formed on a first surface 21a1 of the positive current collector 21a. In a plan view as viewed in the stacking direction (hereinafter, simply called a plan view), the positive electrode active material layer 21b is formed in a middle portion of the first surface 21a1 of the positive current collector 21a. A peripheral edge portion of the first surface 21a1 of the positive current collector 21a in the plan view corresponds to a positive electrode uncoated portion 21c on which the positive electrode active material layer 21b is not formed. The positive electrode uncoated portion 21c is disposed so as to enclose the positive electrode active material layer 21b in the plan view.

A negative electrode 22 includes a negative current collector 22a and a negative electrode active material layer 22b formed on a first surface 22al of the negative current collector 22a. In the plan view, the negative electrode active material layer 22b is formed in a middle portion of the first surface 22al of the negative current collector 22a. A peripheral edge portion of the first surface 22al of the negative current collector 22a in the plan view corresponds to a negative electrode uncoated portion 22c on which the negative electrode active material layer 22b is not formed. The negative electrode uncoated portion 22c is disposed so as to enclose the negative electrode active material layer 22b in the plan view. The positive electrode 21 and the negative electrode 22 are disposed in such a manner that the positive electrode active material layer 21b and the negative electrode active material layer 22b face each other in the stacking direction. That is, a direction in which the positive electrode 21 and the negative electrode 22 face each other coincides with the stacking direction. The negative electrode active material layer 22b has the same size as that of the positive electrode active material layer 21b or is formed slightly larger than the positive electrode active material layer 21b. When the negative electrode active material layer 22b is formed slightly larger than the positive electrode active material layer 21b, in the plan view, a whole of a forming range of the positive electrode active material layer 21b is located inside a forming range of the negative electrode active material layer 22b.

The positive current collector 21a has a second surface 21a2 opposite to the first surface 21a1. The positive electrode 21 is an electrode having a monopolar structure where neither positive electrode active material layer 21b nor the negative electrode active material layer 22b is formed on the second surface 21a2 of the positive current collector 21a. The negative current collector 22a has a second surface 22a2 opposite to the first surface 22a1. The negative electrode 22 is an electrode having a monopolar structure where neither positive electrode active material layer 21b nor the negative electrode active material layer 22b is formed on the second surface 22a2 of the negative current collector 22a.

The separator 23 is disposed between the positive electrode 21 and the negative electrode 22 to maintain a distance therebetween, thereby preventing short circuit between the positive electrode 21 and the negative electrode 22 while allowing charge carriers such as lithium ions to pass through the separator 23.

The separator 23 is, for example, a porous sheet or a nonwoven fabric containing a polymer absorbing and keeping the electrolyte inside. Examples of materials for the separator 23 include polyolefins such as polypropylene and polyethylene, and polyester. The separator 23 may have a monolayer structure or a multilayer structure. The multilayer structure may have, for example, an adhesive layer and a ceramic layer as a heat-resistant layer.

The spacer 24 is disposed on outer peripheries of the positive electrode active material layer 21b and the negative electrode active material layer 22b between the first surface 21a1 of the positive current collector 21a of the positive electrode 21 and the first surface 22a1 of the negative current collector 22a of the negative electrode 22. The spacer 24 adheres to both of the positive current collector 21a and the negative current collector 22a. The spacer 24 maintains a distance between the positive current collector 21a and the negative current collector 22a to prevent short circuit between the current collectors, and forms a liquid-tightly sealed space between the current collectors.

The spacer 24 is formed in a frame shape in the plan view, the frame shape extending along the peripheral edge portions of the positive current collector 21a and the negative current collector 22a and enclosing the positive current collector 21a and the negative current collector 22a. The spacer 24 is disposed between the positive electrode uncoated portion 21c of the first surface 21a1 of the positive current collector 21a and the negative electrode uncoated portion 22c of the first surface 22a1 of the negative current collector 22a.

Examples of a material for forming the spacer 24, include various resin materials such as polyethylene (PE), modified polyethylene (modified PE), polystyrene (PS), polypropylene (PP), modified polypropylene (modified PP), ABS resin, or AS resin.

Each of the power storage cells 20 has therein a sealed space S surrounded by the spacer 24 having the frame shape, the positive electrode 21, and the negative electrode 22. The separator 23 and the electrolyte are accommodated in the sealed space S. A peripheral edge portion of the separator 23 is embedded in the spacer 24.

Examples of the electrolyte include a liquid electrolyte and a polymer gel electrolyte containing an electrolyte kept in polymer matrix. Examples of the liquid electrolyte include a liquid electrolyte containing a non-aqueous solvent and an electrolyte salt dissolved in the non-aqueous solvent. A known lithium salt, such as $LiClO_4$, $LiAsF_6$, $LiPF_6$, $LiBF_4$, $LiCF_3SO_3$, $LiN(FSO_2)_2$, or $LiN(CF_3SO_2)_2$ may be used as the electrolyte salt. A known solvent such as cyclic carbonates, cyclic esters, chain carbonates, chain esters, or ethers may be used as the non-aqueous solvent. It is noted that two or more of these known solvents may be used in combination.

The spacer 24 forms the sealed space S between the positive electrode 21 and the negative electrode 22, thereby preventing the electrolyte which is accommodated in the sealed space S from flowing to the outside of the power storage device 10. In addition, the spacer 24 prevents moisture from entering the sealed space S from the outside of the power storage device 10. Furthermore, the spacer 24 prevents gas generated from the positive electrode 21 or the negative electrode 22 due to a charging and discharging reaction, or the like from leaking to the outside of the power storage device 10, for example.

FIG. 2 illustrates arrangement of the negative electrode active material layer 22b and the spacer 24 on the first surface 22a1 of the negative current collector 22a, and shapes of the negative electrode active material layer 22b and the spacer 24 in the plan view. The negative electrode active material layer 22b has a rectangular shape in the plan view and is formed in the middle portion of the first surface 22a1 of the negative current collector 22a. An outer peripheral portion of the first surface 22a1 of the negative current collector 22a, on which the negative electrode active material layer 22b is not formed, corresponds to a negative electrode uncoated portion 22c.

An inner peripheral edge and an outer peripheral edge of the spacer 24 are each formed in a rectangular shape, that is, the spacer 24 is formed in a rectangular frame shape in the plan view. The spacer 24 adheres to the negative electrode uncoated portion 22c of the first surface 22a1 of the negative current collector 22a. The rectangular inner peripheral edge of the spacer 24 is formed slightly larger than the rectangular negative electrode active material layer 22b. The negative electrode uncoated portion 22c of the negative current collector 22a has a negative electrode non-adhesive portion 22c1 to which the spacer 24 does not adhere. In other words, an area of the first surface 22a1 of the negative current collector 22a, to which the spacer 24 does not adhere, includes a first area where the negative electrode active material layer 22b is formed and a second area where the negative electrode active material layer 22b is not formed, and the area where the negative electrode active material layer 22b is not formed corresponds to the negative electrode non-adhesive portion 22c1.

Sides constituting the rectangular inner peripheral edge of the spacer 24 are each in parallel with a corresponding side of the negative electrode active material layer 22b facing each other. Accordingly, the negative electrode non-adhesive portion 22c1 is formed in a rectangular frame shape in the plan view, and an inner peripheral edge and an outer peripheral edge of the negative electrode non-adhesive portion 22c1 are each formed in a rectangular shape.

Here, L1 represents a length of the longitudinal side of the negative electrode active material layer 22b in the plan view, and L2 represents a width of the negative electrode non-adhesive portion 22c1 corresponding to a length between the spacer 24 and the negative electrode active material layer 22b in a direction parallel to the longitudinal side of the negative electrode active material layer 22b. In this case, a ratio (L2/L1) of the width L2 of the negative electrode non-adhesive portion 22c1 to the length L1 of the longitudinal side of the negative electrode active material layer 22b is 0.02 or less, preferably 0.01 or less. The ratio (L2/L1) is, for example, 0.002 or more.

The value of the above-described ratio (L2/L1) means that a proportion of a forming range of the negative electrode active material layer 22b in the entire area of the first surface 22a1 of the negative current collector 22a is large and a forming range of the negative electrode non-adhesive portion 22c1 is small relative to the forming range of the negative electrode active material layer 22b. In detail, firstly, after the area of the first surface 22a1 of the negative current collector 22a is set based on usage of the power storage device 10 such as an installation space, the area to which the spacer 24 having the frame shape adheres is set to ensure a sealing performance of the sealed space S. Next, the forming range of the negative electrode non-adhesive portion 22c1 and the forming range of the negative electrode active material layer 22b are set to an area inside the area to which the spacer 24 adheres on the first surface 22a1 of the negative current collector 22a. The forming range of the negative electrode active material layer 22b is set such that a battery capacity (negative electrode capacity) is made as large as possible while the negative electrode non-adhesive portion 22c1 is secured in the first surface 22a1 of the negative electrode current collector 22a in order to form a surplus space for receiving gas that is generated during charging and discharging.

The length L1 of the longitudinal side of the negative electrode active material layer 22b is preferably 800 mm or more, more preferably 1000 mm or more. The length L1 of the longitudinal side of the negative electrode active material layer 22b is preferably 2500 mm or less, more preferably 1600 mm or less. The width L2 of the negative electrode non-adhesive portion 22c1 is preferably 3 mm or more, more preferably 5 mm or more. The width L2 of the negative electrode non-adhesive portion 22c1 is, for example, 30 mm or less. When the shape of the negative electrode active material layer 22b in the plan view is square, either one of two sets of opposite sides of the square is considered to be the longitudinal side.

Although not illustrated, arrangement of the positive electrode active material layer 21b and the spacer 24 on the first surface 21a1 of the positive current collector 21a, and shapes of the positive electrode active material layer 21b and the spacer 24 in the plan view also have the same configuration as that of the above-described negative electrode 22.

In detail, the positive electrode active material layer 21b has a rectangular shape in the plan view and is formed in the middle portion of the first surface 21a1 of the positive current collector 21a. An outer peripheral portion of the first surface 21a1 of the positive current collector 21a, on which the positive electrode active material layer 21b is not formed, corresponds to the positive electrode uncoated portion 21c. The positive electrode uncoated portion 21c has a positive electrode non-adhesive portion 21c1 (not illustrated) to which the spacer 24 does not adhere. The sides constituting the rectangular inner peripheral edge of the spacer 24 are each in parallel with a corresponding side of the positive electrode active material layer 21b facing each other. Accordingly, the positive electrode non-adhesive portion 21c1 is formed in a rectangular frame shape in the plan view, and an inner peripheral edge and an outer peripheral edge of the positive electrode non-adhesive portion 21c1 are each formed in a rectangular shape.

Here, similarly to the negative electrode 22, L1 represents a length of the longitudinal side of the positive electrode active material layer 21b in the plan view, and L2 represents a width of the positive electrode non-adhesive portion 21c1 corresponding to a length between the spacer 24 and the positive electrode active material layer 21b in a direction parallel to the longitudinal side of the positive electrode active material layer 21b.

As described above, the positive electrode active material layer 21b may have the same size as that of the negative electrode active material layer 22b or be formed slightly smaller than the negative electrode active material layer 22b.

Here, a case in which the positive electrode active material layer 21b has the same size as that of the negative electrode active material layer 22b is assumed. In this case, a ratio (L2/L1) of the width L2 of the positive electrode non-adhesive portion 21c1 to the length L1 of the longitudinal side of the positive electrode active material layer 21b is 0.02 or less, preferably 0.01 or less. The ratio (L2/L1) is, for example, 0.002 or more. The length L1 of the longitudinal side of the positive electrode active material layer 21b is preferably 800 mm or more, more preferably 1000 mm or more. The length L1 of the longitudinal side of the positive electrode active material layer 21b is preferably 2500 mm or less, more preferably 1600 mm or less. The width L2 of the positive electrode non-adhesive portion 21c1 is preferably 3 mm or more, more preferably 5 mm or more. The width L2 of the positive electrode non-adhesive portion 21c1 is, for example, 30 mm or less. When the shape of the positive electrode active material layer 21b in the plan view is square, either one of two sets of opposite sides of the square is considered to be the longitudinal side.

Next, a case is assumed in which the positive electrode active material layer 21b is formed slightly smaller than the negative electrode active material layer 22b. In this case, the length L1 of the longitudinal side of the positive electrode active material layer 21b is shorter than the length L1 of the longitudinal side of the negative electrode active material layer 22b. The length L2 of the positive electrode non-adhesive portion 21c1 is longer than the width L2 of the negative electrode non-adhesive portion 22c1 according to the shortened length of the length L1 of the longitudinal side of the positive electrode active material layer 21b.

In this case, each range of the length L1 of the longitudinal side of the positive electrode active material layer 21b, the width L2 of the positive electrode non-adhesive portion 21cl, and the ratio (L2/L1) is shifted according to the shortened length of the length L1 of the longitudinal side of the positive electrode active material layer 21b, as compared to the case where the positive electrode active material layer 21b has the same size as that of the negative electrode active material layer 22b. Specifically, the range of the length L1 of the longitudinal side of the positive electrode active material layer 21b is shifted such that the length L1 of the longitudinal side of the positive electrode active material layer 21b is smaller, the range of the width L2 of the positive electrode non-adhesive portion 21c1 is shifted such that the width L2 of the positive electrode non-adhesive portion 21*c*1 is larger, and the range of the ratio (L2/L1) is shifted such that the ratio (L2/L1) is larger.

The positive electrode active material layer 21*b* and the negative electrode active material layer 22*b*, which are each formed in the rectangular shape in the plan view, each have four corners C. FIG. 2 illustrates only the negative electrode active material layer 22*b*. Each of the corners C has a shape chamfered in an arc shape. The shape of the corner C, which is chamfered in the arc shape, may be formed to be an arc shape by a chamfering process after the active material layer is formed on the current collector or formed so that the corner C has an arc shape when the active material layer is formed on the current collector.

Examples of the shape chamfered in the arc shape include a circular arc shape having a constant curvature, an elliptical arc shape having a gradually changing curvature, and a shape in which a plurality of curved portions containing circular arcs or elliptical arcs are connected directly or connected via straight portions.

Examples of the circular arc shape include a circular arc shape protruding outward and a circular arc shape protruding inward. In FIG. 2, as one example of the circular arc shape, the arc-shaped corner C protruding outward is illustrated.

Figure 4A:
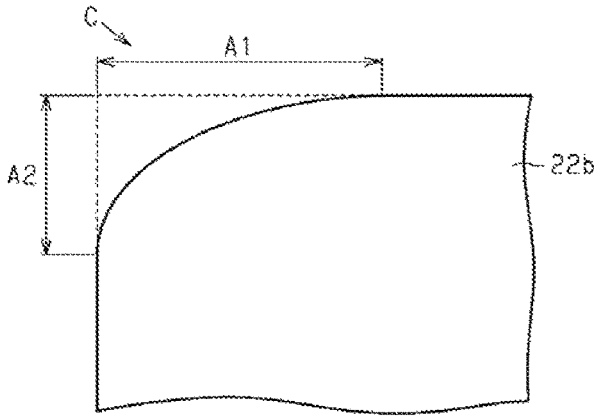
FIG. 4A illustrates a corner having an elliptic arc shape.

Examples of the elliptical arc shape include an elliptical arc shape protruding outward and an elliptical arc shape protruding inward. FIG. 4A illustrates the elliptical arc-shaped corner C protruding outward.

Figure 4B:
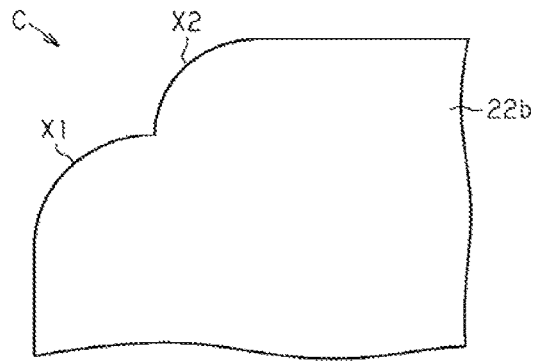
FIG. 4B illustrates a corner having a shape in which a plurality of curved portions are directly connected.

FIG. 4B illustrates, as one example of the shape in which the plurality of curved portions are connected, the corner C having a shape in which two circular arcs X1, X2 protruding outward are directly connected to each other. In the shape in which the plurality of curved portions are connected, the number of the curved portions connected to each other is not particularly limited. In circular arcs or elliptical arcs constituting the plurality of curved portions, the length and the curvature each may be the same or may differ in part or all. In addition, a part of the curved portions may have the arc shape protruding inward.

Figure 4C:
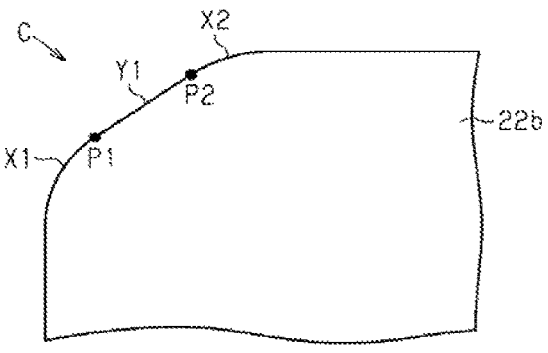
FIG. 4C illustrates a corner having a shape in which a plurality of curved portions are connected via a straight portion.

FIG. 4C illustrates, as one example of the shape in which the plurality of curved portions are connected via the straight portions, the corner C having a shape in which two circular arcs X1, X2 protruding outward are connected to each other via a straight line Y1. The straight line Y1 is a tangent line at a connecting point P1 on the arc X1 and at a connecting point P2 on the arc X2.

In the shape in which the plurality of curved portions are connected via the straight portions, the number of the connected curved portions and the number of the straight portions are not particularly limited. In circular arcs or elliptical arcs constituting a shape in which the plurality of circular arcs and the plurality of elliptical arcs are connected, the lengths and the curvatures each may be the same or may differ in part or all. The straight line connecting the circular arcs, the elliptical arcs, or the circular arc to the elliptical arc is not limited to a tangent line at the connecting point on each circular arc or each elliptical arc.

The shape in which the plurality of curved portions are connected directly or via the straight portions is preferably a shape in which a curved portion connecting to the longitudinal side of the active material layer having the corner C and a curved portion connecting to the short side of the active material layer are connected directly or via the straight portion. Preferably, the shape in which the plurality of curved portions are connected directly or via the straight portions does not have a corner sharply protruding on an outer peripheral side of the corner.

A radius of curvature of a portion on the corner C having the arc shape, the portion having the maximum curvature, is 5 mm or more, preferably 10 mm or more. The above-described radius of curvature is preferably 30 mm or less, more preferably 20 mm or less.

A forming range of the corner C having the shape chamfered in the arc shape includes a forming range A1 extending in a direction parallel to the longitudinal side of the active material layer having the corner C. The forming range A1 is preferably 5 mm or more, more preferably 10 mm or more. The forming range A1 is, for example, 30 mm or less. A forming range A2 parallel to the short side of the active material layer having the corner C is preferably 5 mm or more, more preferably 10 mm or more. The forming range A2 is, for example, 30 mm or less. In the corner C of the circular arc shape or the elliptical arc shape protruding outward, the forming range of the corner C is, for example, a range in which a central angle θ of the circular arc is 30 degree or more and 90 degree or less, preferably a range in which the central angle θ is 90 degree.

The shapes of the corners C of the negative electrode active material layer 22*b* may be all the same or differ in the ranges in which the above-described numeral conditions are satisfied. Similarly to the negative electrode active material layer 22*b*, the shapes of the corners C of the positive electrode active material layer 21*b* may be all the same or differ in the ranges where the above-described numeral conditions are satisfied.

In the present embodiment, the negative electrode 22, the negative current collector 22*a*, and the negative electrode active material layer 22*b* correspond to the first electrode, the first current collector, and the first active material layer, respectively. The negative electrode non-adhesive portion 22*c*1 corresponds to a second area where the first active material layer is not formed in the area to which the spacer on the first surface of the first current collector does not adhere. In addition, the positive electrode 21, the positive current collector 21*a*, and the positive electrode active material layer 21*b* correspond to the second electrode, the second current collector, and the second active material layer, respectively.

As illustrated in FIG. 1, the cell stack 30 has a structure in which the plurality of power storage cells 20 are stacked directly or indirectly in such a manner that the second surface 21*a*2 of each of the positive current collectors 21*a* and the second surface 22*a*2 of each of the negative current collectors 22*a* are electrically in contact with each other. Thus, the plurality of the power storage cells 20 constituting the cell stack 30 are connected in series.

Here, in the cell stack 30, a simulated bipolar electrode 25, in which the positive current collector 21*a* and the negative current collector 22*a* that are in contact with each other are regarded as one current collector, is formed of any two of the power storage cells 20 arranged side by side in the stacking direction. The simulated bipolar electrode 25 includes a current collector having a structure in which the positive current collector 21*a* is stacked on the negative current collector 22*a*, the positive electrode active material layer 21*b* formed on one surface of the current collector, and the negative electrode active material layer 22*b* on the other surface of the current collector.

The power storage device 10 includes a pair of current conductors, that is, a positive electrode conductive plate 40 and a negative electrode conductive plate 50 that are disposed so as to hold the cell stack 30 therebetween in a stacking direction of the cell stack 30. The positive electrode conductive plate 40 and the negative electrode conductive plate 50 are each made of a material superior in electric conductivity.

The positive electrode conductive plate 40 is electrically connected to the second surface 21a2 of the positive current collector 21a of the positive electrode 21 that is disposed on one end of the cell stack 30 in the stacking direction. The negative electrode conductive plate 50 is electrically connected to the second surface 22a2 of the negative current collector 22a of the negative electrode 22 that is disposed on the other end of the cell stack 30 in the stacking direction.

The power storage device 10 is charged and discharged through terminals provided in the positive electrode conductive plate 40 and the negative electrode conductive plate 50. The same material as that used for the positive current collector 21a may be used for constituting the electrode conductive plate 40. The positive electrode conductive plate 40 may be made of a metal plate thicker than that of the positive current collector 21a used for the cell stack 30. The same material as that used for the negative current collector 22a may be used for constituting the negative electrode conductive plate 50. The negative electrode conductive plate 50 may be made of a metal plate thicker than that of the negative current collector 22a used for the cell stack 30.

The following will describe details of the positive current collector 21a, the negative current collector 22a, the positive electrode active material layer 21b, and the negative electrode active material layer 22b.

<Positive Current Collector and Negative Current Collector>

The positive current collector 21a and the negative current collector 22a each correspond to a chemically inactive electric conductor through which a current flows continuously into the positive electrode active material layer 21b and the negative electrode active material layer 22b during charging and discharging of the lithium-ion battery. The positive current collector 21a and the negative current collector 22a each have a foil shape. The thickness of each of the positive current collector 21a and the negative current collector 22a having the foil shape is independently set, for example, 1 μm or more and 100 μm or less, preferably 10 μm or more and 60 μm or less. The positive current collector 21a and the negative current collector 22a may be made of a metal material, a conductive resin material, and a conductive inorganic material, for example.

Examples of the above-described metal material include copper, aluminum, nickel, titanium, and a stainless steel. Examples of the above-described conductive resin material include a conductive polymer material and a resin obtained by adding a conductive filler to a non-conductive polymer material as needed.

One of the positive current collectors 21a and the negative current collector 22a, or both of them may include one or more layers having the metal material or the conductive resin material as described above. A surface of one of the positive current collectors 21a or the negative current collectors 22a or surfaces of both of them may be covered with a known protective layer. A surface of one of the positive current collectors 21a or the negative current collectors 22a or both of them may be treated using a known method such as plating. Examples of the above-described surface-treatment include a chromate conversion coating and a chromate-phosphate conversion coating.

In one preferable example of the positive current collector 21a and the negative current collector 22a, the positive current collector 21a is made of aluminum foil and the negative current collector 22a is made of copper foil.

<Positive Electrode Active Material Layer and Negative Electrode Active Material Layer>

The positive electrode active material layer 21b contains a positive electrode active material that absorbs and desorbs charge carriers such as lithium ions. In one example, a lithium composite metal oxide having a layered rock salt structure, a metal oxide having a spinel structure, and a polyanionic compound are usable as the positive electrode active material of the lithium-ion secondary battery. Two or more kinds of positive electrode active materials may be used in combination. In the present embodiment, the positive electrode active material layer 21b contains olivine-type lithium iron phosphate ($LiFePO_4$) as the polyanionic compound.

The negative electrode active material layer 22b is not limited to any particular material and any material is usable for the negative electrode active material layer 22b as long as the material is a single substance, an alloy, or a compound that absorbs and desorbs charge carriers such as lithium-ions. Examples of the negative electrode active material includes Li, a carbon-based active material, a metal compound, and an element alloyed with lithium or a compound thereof. Examples of the carbon-based active material include natural graphite, artificial graphite, hard carbon (non-graphitizable carbon), and soft carbon (graphitizable carbon). Examples of the artificial graphite include highly oriented graphite and mesocarbon microbeads. Examples of the element alloyed with lithium include silicon and tin. In the present embodiment, the negative electrode active material layer 22b contains the carbon-based active material.

The positive electrode active material layer 21b and the negative electrode active material layer 22b (hereinafter, also simply called the active material layer) may further contain a conductive assistant, a binder, an electrolyte (polymer matrix, ion-conducting polymer, liquid electrolyte, and the like), and an electrolyte supporting salt (lithium salt) that increases ionic conductivity, and the like. Components contained in the active material layer or a compounding ratio of the components, and a thickness of the active material layer are not limited to any particular components, any particular compounding ratio, and any particular thickness, and may be determined with reference to public knowledge for the lithium-ion secondary battery as appropriate.

The conductive assistant is added in order to increase electric conductivity of the positive electrodes 21 or the negative electrodes 22. The conductive assistant is, for example, acetylene black, carbon black, or graphite.

Examples of the binder include fluorine-containing resins such as polyvinylidene fluoride, polytetrafluoroethylene, and fluorine rubber; thermoplastic resins such as polypropylene and polyethylene; imide-based resins such as polyimide and polyamide-imide; alkoxysilyl group-containing resins; acrylic resins such as polyacrylic acid resin and polymethacrylic acid resin; styrene-butadiene rubber; carboxymethyl cellulose; alginates such as sodium alginate and ammonium alginate; water-soluble cross-linked cellulose ester; and starch-acrylic acid graft polymers. These binders may be used alone or in any combination of two or more. Water, N-methyl-2-pyrrolidone, or the like is used as a solvent or a dispersion medium.

The thickness and the weight per unit area of the active material layer are not limited in particular, and may be determined with reference to public knowledge for the lithium-ion secondary battery as appropriate. However, in view of increasing the energy density of the power storage cells 20, it is preferable to increase the thickness and the weight per unit area of the active material layer. Specifically, the thickness of the positive electrode active material layer 21b is, for example, 100 μm or more and 400 μm or less, preferably 200 μm or more. The weight per unit area of the positive electrode active material layer 21b is, for example, 40 mg/cm² or more and 80 mg/cm² or less, preferably 50 mg/cm². The thickness of the negative electrode active material layer 22b is, for example, 100 μm or more and 400 μm or less, preferably 200 μm or more. The weight per unit area of the negative electrode active material layer 22b is, for example, 20 mg/cm² or more and 40 mg/cm² or less, preferably 25 mg/cm² or more.

As a method of forming the active material layer on each surface of the positive current collectors 21a and the negative current collectors 22a, a known method such as a roll coating method may be used.

In order to enhance thermal stability of the positive electrodes 21 or the negative electrodes 22, the above-described heat-resistant layer may be formed on the surface of the active material layer.

The following will describe operations according to the present embodiment.

The power storage device 10 of the present embodiment includes the spacer 24 forming the sealed space S between the positive electrode 21 and the negative electrode 22. The outer peripheral portion of the first surface 22a1 of the negative current collector 22a is fixed by the spacer 24. In the first surface 22a1 of the negative current collector 22a, the negative electrode non-adhesive portion 22c1 that is located between the portion in which the negative electrode active material layer 22b is formed and the portion to which the spacer 24 adheres is significantly smaller than the forming range of the negative electrode active material layer 22b, which adheres to the central portion of the first surface 22a1 of the negative current collector 22a.

In a case of the power storage device having the above-described configuration, while the negative electrode active material layer 22b expands largely in a surface direction thereof during charging and discharging, the negative electrode non-adhesive portion 22c1 largely deform with the expansion and contraction of the negative electrode active material layer 22b because the negative electrode non-adhesive portion 22c1, which deforms with the deforming of the negative electrode active material layer 22b, is smaller than the forming range of the negative electrode active material layer 22b. As a result, a load applied to the negative electrode non-adhesive portion 22c1 by the expansion and contraction of the negative electrode active material layer 22b increases so that wrinkles and tears are easily formed in the negative electrode non-adhesive portion 22c1.

In particular, in the case where the negative electrode active material layer 22b has a rectangular shape in the plan view, a stress by the expansion of the negative electrode active material layer 22b when the negative electrode active material layer 22b expands is concentrated on a point at a tip of each corner C. For this reason, a large load is partially applied to the portion of the negative electrode non-adhesive portion 22c1 located near the tip of the corner C, and the maximum strain is generated in that portion.

In the present embodiment, each corner C of the negative electrode active material layer 22b is formed in the shape chamfered in the arc shape. With this configuration, during the expansion of the negative electrode active material layer 22b, concentration of the stress applied to the tip of the corner C of the negative electrode active material layer 22b is reduced, and the stress transmitted from the corner C to the negative electrode non-adhesive portion 22c1 is distributed over a wide range. As a result, the maximum strain generated in the negative electrode non-adhesive portion 22c1 during the expansion of the negative electrode active material layer 22b decreases, which prevents the wrinkles and tears from being formed in the negative electrode non-adhesive portion 22c1. In the present embodiment, since the positive electrode 21 has the same configuration as that of the negative electrode 22, wrinkles and tears are also prevented from being formed in the positive electrode non-adhesive portion 21c1 by the same mechanism as those of the negative electrode non-adhesive portion 22c1.

Here, a relationship between the thickness of the current collector and the maximum strain generated in the current collector by one cycle of charging and discharging and a relationship between the shape of each corner of the active material layer and the maximum strain are simulated with a computer. Electrodes in Models 1 to 4 used for this simulation each correspond to a negative electrode having a current collector made of a copper foil and a carbon-based active material. The detailed configurations of the electrodes are shown in Table 1. In each Model, a corner of the active material layer is set in a circular arc shape, and an electrode angle R (radius of curvature) of the corner having the circular arc shape is changed to 0, 5, 10, 15, 25, and 30 mm. The above-described width L2 of the non-adhesive portion of the current collector is set to 8 mm, and a forming range of the corner having the circular arc shape is set such that the central angle θ of the corner is 90 degree. An expansion ratio of the active material layer in a surface direction thereof during one cycle of charging and discharging is assumed to 9%. The maximum foil strain during the one cycle of charging and discharging is obtained by the simulation on the above-described conditions. The results are shown in the graph of FIG. 3.

TABLE 1

|  | Kinds of current collectors | Size of active material layer (mm) |
|---|---|---|
| Model 1 | Copper film of 6 μm in thickness | 1300 wide by 1000 deep |
| Model 2 | Copper film of 10 μm in thickness | 1300 wide by 1000 deep |
| Model 3 | Copper film of 15 μm in thickness | 1300 wide by 1000 deep |
| Model 4 | Copper film of 6 μm in thickness | 1000 wide by 750 deep |

Figure 3:
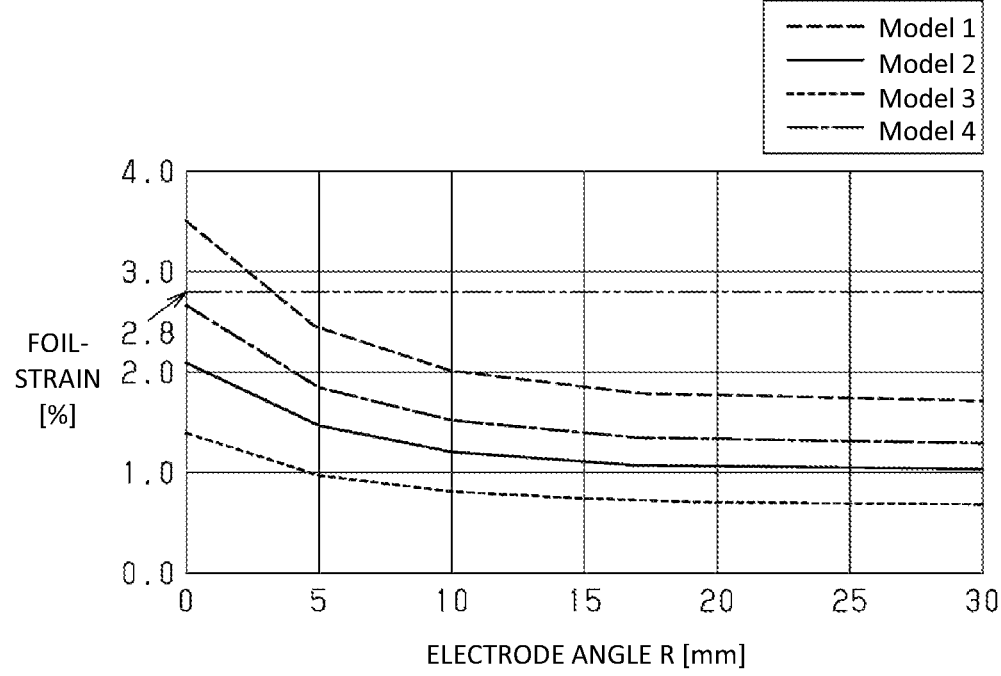
FIG. 3 is a graph showing a result of a simulation test.

With reference to FIG. 3, the simulation results will be discussed. The results of Models 1, 2 and 3, which is different in thickness of the copper foil as the current collector, show that the maximum strain generated in the current collector increases as the thickness of the current collector decreases. The results of Models 1 and 4, which are different only in the size of the active material layer, show that the maximum strain generated in the current collector increases as the size (area) of the active material layer increases, that is, the width of the non-adhesive portion for the length of the longitudinal side of the current collector decreases. The tendency that the maximum strain generated in the current collector increases when the thickness of such a current collector decreases and when the size of the active material layer increases is common regardless of the shape of the corner of the active material layer.

In all of Models 1 to 4, compared to the case where the corner of the active material layer is at right angle (the radius of curvature is 0 mm), in a case where the corner of the active material layer is set in a circular arc shape having the radius of curvature of 5 mm, the maximum strain generated in the current collector becomes smaller. The maximum strain generated in the current collector when the corner of the active material layer is set in the circular arc shape decreases as the radius of curvature increases from 5 mm to 10 mm, and to 30 mm. An effect of decreasing the maximum strain is remarkably seen when the radius of curvature is between 0 mm and 5 mm and between 5 mm and 10 mm. However, the effect of further decreasing the maximum strain by increasing the radius of curvature is hardly seen when the radius of curvature is between 25 mm and 30 mm.

Accordingly, in view of decreasing the maximum strain, it is effective that the radius of curvature of the corner having the circular arc shape is set to 5 mm or more or 10 mm or more. In view of increasing the size of the active material layer to ensure a battery capacity, it is effective that the radius of curvature of the corner having the circular arc shape is set to 30 mm or less.

Based on the above-described results, a simulation about the effect of the maximum strain during one cycle of charging and discharging on the number of cycles of the power storage device and the tears of foil is performed by the computer. The result of the simulation shows that when the maximum strain during the one cycle of charging and discharging can be reduced to 2.8% or less, the tears of foil are prevented until the number of cycles reaches 3000 cycles, which correspond to a cycle life of a general power storage device, such as a power storage device for vehicles.

With reference to the simulation results illustrated in FIG. 3, when the radius of curvature of the corner having the circular arc shape is 5 mm or more, the maximum strain generated during one cycle of charging and discharging is reduced to 2.8% or less in also Models 1 and 4 in which the thin copper foil having a thickness of 6 μm is used. Accordingly, when the radius of curvature of the corner having the circular arc shape is set to 5 mm or more, the tears of foil are prevented from being formed until the number of cycles reaches 3000 cycles, which correspond to the cycle life of the general power storage device.

Compared to the other metal foil used for the current collector, the copper foil is often used in a small thickness. The copper foil is often used in a thickness of 10 μm or more in view of preventing pinholes, or the like. For that reason, the result that the effect of sufficiently suppressing the maximum strain is seen in Models 1 and 4 in which the thin copper foil having the thickness of 6 μm is used suggests that the same effect will be obtained in a current collector made of the other material.

The present embodiment provides the advantageous effects as described later.

(1) The power storage device 10 includes the positive electrodes 21 each having the positive current collector 21a and the positive electrode active material layer 21b, the negative electrode 22 each having the negative current collector 22a and the negative electrode active material layer 22b, the separator 23 interposed between the positive electrode active material layer 21b and the negative electrode active material layer 22b, and the spacer 24 disposed between the positive electrode 21 and the negative electrode 22. The spacer 24 is disposed so as to enclose the positive electrode active material layer 21b and the negative electrode active material layer 22b and adheres to the first surfaces of the positive current collector 21a and the negative current collector 22a to form the sealed space between the positive electrode 21 and the negative electrode 22. The negative electrode active material layer 22b has a rectangular shape in the plan view as viewed in the stacking direction. The area of the first surface 22a1 of the negative current collector 22a, to which the spacer 24 does not adhere, includes the first area where the negative electrode active material layer 22b is formed and negative electrode non-adhesive portion 22c1 corresponding to the second area where the negative electrode active material layer 22b is not formed. The ratio (L2/L1) of the width L2 of the negative electrode non-adhesive portion 22c1 to the length L1 of the longitudinal side of the negative electrode active material layer 22b in the plan view is 0.02 or less. The corners C of the negative electrode active material layer 22b each have the shape chamfered in the arc shape, and the radius of curvature at a portion of the corner C having the maximum curvature is 5 mm or more.

The above-described configuration decreases the maximum strain generated in the negative electrode non-adhesive portion 22c1 during the expansion of the negative electrode active material layer 22b, so that wrinkles and tears are prevented from being formed in the negative electrode non-adhesive portion 22c1. The same goes for the positive electrode 21.

(2) Each corner C of the negative electrode active material layer 22b has the arc shape protruding outward.

In the above-described configuration, the corner does not have a portion sharply protruding outward, so that the concentration of the stress by the expansion of the negative electrode active material layer 22b on the portion of the corner is suppressed. For that reason, the effect of the above-described (1) is further remarkably seen. As compared to the corner C which is C-chamfered, the amount of decreasing the area of the negative electrode active material layer 22b, which is caused by chamfering the corner C, can be kept small, thereby suppressing the reduction in the capacity of the negative electrode 22.

When each corner C has the circular arc shape, as compared to the corner C having the elliptical arc shape, the effect of suppressing the concentration of the stress by the expansion of the negative electrode active material layer 22b increases. When each corner C has the elliptical arc shape, as compared to the corner C having the circular arc shape, the amount of decreasing the area of the negative electrode active material layer 22b, which is caused by chamfering the corner C, can be kept small. For example, when the negative electrode active material layer 22b has a rectangular shape having the longitudinal side and the short side in the plan view, the forming range of the corner C having the circular arc shape is set according to the length of the corner C parallel to the longitudinal side extending in the direction in which the expansion amount is large. In this case, when the circular arc-shaped corner C having the constant curvature is employed, since the forming range A1 of the corner C parallel to the longitudinal side is equal to the forming range A2 parallel to the short side, the forming range A2 of the corner C parallel to the short side is larger than necessary. On the other hand, when the corner C is formed in the elliptical arc shape having the curvature gradually increasing from the longitudinal side to the short side as illustrated in FIG. 4A, the forming range A2 of the corner C parallel to the short side is smaller than the forming range A1 of the corner C parallel to the longitudinal side. Thus, the amount of decreasing the area of the negative electrode active material layer 22b, which is caused by chamfering the corner C, can be kept small. The effect of (2) is the same for the positive electrode 21.

(3) The radius of curvature of the corner C is 10 mm or more.

With the above-described configuration, the maximum strain generated in the positive electrode non-adhesive portion 21c1 and the negative electrode non-adhesive portion 22c1 can be further reduced.

(4) The radius of curvature of the corner C is 30 mm or less.

The effect of decreasing the maximum strain generated in the positive electrode non-adhesive portion 21c1 and the negative electrode non-adhesive portion 22c1 by increasing the radius of curvature of the corner C converges when the radius of curvature of the corner C is over 30 mm. Thus, the above-described configuration suppresses the reduction in the capacities of the positive electrode 21 and the negative electrode 22, which is caused by decreasing the areas of the positive electrode active material layer 21b and the negative electrode active material layer 22b because of forming the corner C having the arc shape larger than necessary.

(5) The negative current collector 22a is made of a copper foil and the negative electrode active material layer 22b contains a carbon-based active material.

In the configuration in which the negative electrode active material layer 22b, which contains the carbon-based active material having the large expansion ratio during charging and discharging, and the copper foil are combined with each other, wrinkles and tears are particularly easily formed in the negative current collector 22a by the expansion and contraction of the negative electrode active material layer 22b during the charging and discharging. For that reason, the effect of the above-described (1) is further remarkably seen.

(6) The power storage device 10 has a structure in which the positive electrode 21, the negative electrode 22, and the separator 23 are stacked repeatedly, and the second surface 21a2 opposite to the first surface 21a1 in the positive current collector 21a and the second surface 22a2 opposite to the first surface 22a1 in the negative current collector 22a are in contact with each other.

In this case, when wrinkles are formed in the positive electrode non-adhesive portion 21c1 and the negative electrode non-adhesive portion 22c1, the contact area between the second surface 21a2 of the positive current collector 21a and the second surface 22a2 of the negative current collector 22a decreases, thereby increasing a resistance. When the technique of the above-described (1) is applied to such a configuration, the effect of suppressing the reduction in the battery capacity is obtained in addition to the effect of preventing the wrinkles from being formed in the positive electrode non-adhesive portion 21c1 and the negative electrode non-adhesive portion 22c1.

The present embodiment may be modified as described below. The present embodiment and the modifications below may be combined with each other appropriately as long as there is no technical contradiction.

In the above-described embodiment, all of the four corners C of the negative electrode active material layer 22b is formed in the shape chamfered in the arc shape. However, at least one of the corners C of the negative electrode active material layer 22b only need be formed in the shape chamfered in the arc shape. When the plurality of corners C are each formed in the shape chamfered in the arc shape, the shapes may be the same or may differ in part or all.

When the negative electrode 22 has the configuration of the above-described embodiment, the configuration of the positive electrode 21 is not limited to the configuration of the above-described embodiment. The shape of the positive electrode active material layer 21b, the ratio of the width L2 of the positive electrode non-adhesive portion 21c1 to the length L1 of the longitudinal side of the positive electrode active material layer 21b, and the shape of each corner C of the positive electrode active material layer 21b are not limited to the configuration of the above-described embodiment, and a known configuration may be applied to them. In this case, the negative electrode 22 serves as the first electrode.

The size of the positive electrode active material layers 21b and the size of the negative electrode active material layers 22b in the plan view may be the same.

A conductive layer which adheres to the positive current collector 21a may be formed between the positive electrode conductive plate 40 and the positive current collector 21a in order to obtain a greater electrical contact performance therebetween. Examples of the conductive layer include a layer having a hardness lower than that of the positive current collector 21a, such as a plating layer containing Au and a layer containing carbon such as acetylene black or graphite. The same conductive layer as that as described above may be formed between the negative electrode conductive plate 50 and the negative current collector 22a.

The number of the power storage cells 20 constituting the power storage device 10 is not particularly limited. The number of the power storage cells 20 constituting the power storage device 10 may be one.

The positive electrode active material layer 21b or the negative electrode active material layer 22b may be formed on the second surface 21a2 of each of the positive current collectors 21a. In addition, the positive electrode active material layer 21b or the negative electrode active material layer 22b may be formed on the second surface 22a2 of each of the negative current collectors 22a.

As the electrode, a bipolar electrode in which the positive current collector 21a and the negative current collector 22a are formed as one current collector by using a bimetal or the like may be used.

The cell stack 30 may have the configuration in which the second surface 21a2 of the positive current collector 21a adheres to the second surface 22a2 of the negative current collector 22a, the second surface 21a2 and the second surface 22a2 corresponding to a contact portion between the power storage cells arranged side by side in the stacking direction. As the method of causing the second surface 21a2 of the positive current collector 21a to adhere to the second surface 22a2 of the negative current collector 22a, an adhesive having electric conductivity may be used.

The following will describe a technical idea that can been seen from the above-described embodiments and the modifications.

(I) The power storage device including a structure in which the positive electrode, the negative electrode, and the separator are stacked repeatedly, wherein a second surface opposite to the first surface in the positive current collector and a second surface opposite to the first surface in the negative current collector are in contact with each other.

REFERENCE SIGNS LIST

C corner
S sealed space
10 power storage device
20 power storage cell
21 positive electrode
21a positive current collector
21b positive electrode active material layer
21c1 positive electrode non-adhesive portion
22 negative electrode
22a negative current collector

22*b* negative electrode active material layer
22*c*1 negative electrode non-adhesive portion
23 separator
24 spacer
30 cell stack
40 positive electrode conductive plate
50 negative electrode conductive plate
The invention claimed is:

1. A power storage device comprising:

a first electrode including a first active material layer formed on a first surface of a first current collector;

a second electrode including a second active material layer formed on a first surface of a second current collector, the second active material layer being disposed so as to face the first active material layer of the first electrode;

a separator interposed between the first active material layer and the second active material layer; and a spacer disposed between the first surface of the first current collector and the first surface of the second current collector, the spacer being disposed so as to enclose the first active material layer and the second active material layer, the spacer adhering to the first surface of the first current collector and the first surface of the second current collector to form a sealed space between the first electrode and the second electrode, and the first active material layer having a rectangular shape in a plan view as viewed in a stacking direction in which the first electrode and the second electrode are stacked, wherein the first surface of the first current collector has an area to which the spacer does not adhere, the area including first area where the first active material layer is formed and a second area where the first active material layer is not formed, the first active material layer has a longitudinal side of a first length in the plan view, the second area has a second length between the spacer and the first active material layer in a direction parallel to the longitudinal side of the first active material layer, a ratio of the second length (L2) to the first length (L1) is 0.02 or less, at least one of corners of the first active material layer has a shape chamfered in an arc shape, and a radius of curvature at a portion of the corner having a maximum curvature is 5 mm or more.

2. The power storage device according to claim 1, wherein the at least one of the corners of the first active material layer has an arc shape protruding outward.

3. The power storage device according to claim 1, wherein the radius of curvature is 10 mm or more.

4. The power storage device according to claim 1, wherein the radius of curvature is 30 mm or less.

5. The power storage device according to claim 1, wherein the first current collector is made of a copper foil and the first active material layer contains a carbon-based active material.

\* \* \* \* \*